(12) United States Patent
Alan

(10) Patent No.: US 9,411,994 B2
(45) Date of Patent: Aug. 9, 2016

(54) METHOD AND SYSTEM OF MANAGING THE SAFETY OF A PLURALITY OF PERSONAL PROTECTION EQUIPMENT ITEMS

(75) Inventor: Neil A. Alan, East Hampton, CT (US)

(73) Assignee: Honeywell International Inc., Morristown, NJ (US)

(*) Notice: Subject to any disclaimer, the term of this patent is extended or adjusted under 35 U.S.C. 154(b) by 948 days.

(21) Appl. No.: 13/250,330

(22) Filed: Sep. 30, 2011

(65) Prior Publication Data

US 2012/0081214 A1 Apr. 5, 2012

Related U.S. Application Data

(60) Provisional application No. 61/389,039, filed on Oct. 1, 2010.

(51) Int. Cl.
*H04Q 5/22* (2006.01)
*G06K 7/10* (2006.01)
*G06Q 10/08* (2012.01)

(52) U.S. Cl.
CPC .......... *G06K 7/10316* (2013.01); *G06Q 10/087* (2013.01)

(58) Field of Classification Search
CPC .................................................. G06K 7/0008
USPC ............ 340/10.1, 572.1, 5.74, 572.8; 141/21; 235/380; 463/12; 700/232; 600/301; 715/854
See application file for complete search history.

(56) References Cited

U.S. PATENT DOCUMENTS

| 6,144,301 A * | 11/2000 | Frieden .................... 340/572.8 |
| 7,172,115 B2 * | 2/2007 | Lauden ....................... 235/380 |
| 2006/0250245 A1 * | 11/2006 | Forster ...................... 340/572.1 |
| 2008/0303631 A1 * | 12/2008 | Beekley et al. ............. 340/5.74 |
| 2009/0090742 A1 * | 4/2009 | Yacko et al. .................. 222/28 |
| 2009/0261948 A1 * | 10/2009 | Ashizawa ............. G06Q 10/06 340/10.1 |
| 2010/0145507 A1 * | 6/2010 | Blust et al. .................... 700/232 |
| 2011/0014963 A1 * | 1/2011 | Walker et al. ................... 463/12 |
| 2011/0041099 A1 * | 2/2011 | Weise et al. .................... 715/854 |
| 2011/0178375 A1 * | 7/2011 | Forster .......................... 600/301 |
| 2011/0227700 A1 * | 9/2011 | Hamerly et al. ............. 340/10.1 |

* cited by examiner

*Primary Examiner* — Benjamin C Lee
*Assistant Examiner* — Israel Daramola
(74) *Attorney, Agent, or Firm* — Wood, Phillips, Katz, Clark & Mortimer

(57) ABSTRACT

A system and method are provided for managing the safety of a plurality (10) of personal protection equipment items (11). The system and method assign unique identifiers (12) to each of the items (11) and encodes the identifiers (12) into Ultra High Frequency RFID chips (18) attached to each of the items (11). A user (29) can identify the specific items (11) in the user's inventory by scanning the chips (18) and the system can provide safety information relevant to each of the specific items (11) based on the chips (18) that are scanned, including training information specific to each item (11), training information specific to each worker (34) assigned to each item (11) by a user (29), and maintenance and/or inspection protocols in the form of images (60) illustrating the steps of the protocols and text (62) explaining the steps.

8 Claims, 4 Drawing Sheets

METHOD AND SYSTEM OF MANAGING THE SAFETY OF A PLURALITY OF PERSONAL PROTECTION EQUIPMENT ITEMS

CROSS-REFERENCE TO RELATED APPLICATIONS

This application claims the benefit of the filing date of U.S. Provisional Ser. No. 61/389,039, filed Oct. 1, 2010, which is hereby incorporated by reference in its entirety.

FEDERALLY SPONSORED RESEARCH OR DEVELOPMENT

Not Applicable.

MICROFICHE/COPYRIGHT REFERENCE

Not Applicable.

FIELD

This application relates to personal protection equipment (hereinafter "PPE") and to systems and methods for managing the safety of such PPE products in the field.

BACKGROUND

To maintain safety, PPE products require routine maintenance and appropriate training for the personnel using the PPE products. Managing the safety of PPE products in the field can be a challenge for any company having workers at one or more locations that utilize PPE products.

In this regard, it is important for a company to appropriately maintain the PPE products that its workers use, ensure that such workers are properly trained with respect to the specific PPE items that they use, remain current on the requirements and standards for the PPE products that they use, and ensure that appropriate PPE products are being utilized by the personnel at each particular job site. To this end, it is known to provide automated systems that utilize accessible electronic databases containing lists of the specific PPE items the personal protection equipment that are used by a company and the safety information relevant to those specific PPE items so that the company can be assisted in managing the safety of and/or the PPE products used by its personnel. Such automated systems are known to use Low Frequency and/or High Frequency RFID (Radio Frequency Identification) chips and 2D bar codes attached to each personal protection equipment item used by a company so that the company can track the safety information relevant to those personal protection equipment items.

The RFID chips and 2D bar codes of conventional systems typically have a 96 bit or smaller identifier encoded or inscribed therein that can be read by a mobile or handheld reader/scanner that is placed closely adjacent the RFID chip and/or bar code so as to wirelessly receive or scan the identifiers. The identifier and the corresponding item of PPE can then be assigned to a particular worker and/or a particular worksite. This information can then be used to access the electronic databases to obtain the safety information relevant to each specific PPE item assigned to a particular worker and/or to a particular worksite. While such systems may perform acceptably for their intended function, there is always room for improvement.

SUMMARY

In accordance with one aspect of the application, a method is provided for managing the safety of a plurality of personal protection equipment items. The method includes the steps of assigning a unique identifier with a size of at least 128 bits to each item of a plurality of personal protection equipment items; for each item of the plurality of personal protection equipment items, encoding the unique identifier assigned to the item into an ultra high frequency RFID chip and attaching the chip to the item either before or after the encoding; storing the assigned unique identifiers in a database that associates each identifier with the item corresponding to the unique identifier; wirelessly receiving the unique identifier from each of a plurality of the chips after they are attached to their corresponding item; automatically accessing the database to determine which items correspond to each of the unique identifiers received in the wirelessly receiving step; and electronically transmitting to a user information specific to the items determined in the automatically accessing step.

As one feature, the assigning step includes assigning a 128 bit unique identifier to each item of the plurality of personal protection equipment items.

In one feature, the step of electronically transmitting information includes transmitting training information corresponding to the items determined in the automatically accessing step.

According to one feature, the method further includes assigning a specific person to at least some of the items determined in the automatically accessing step, and the training information includes training records for each specific person assigned to one of the items.

In one feature, the step of electronically transmitting information includes automatically transmitting the information to the user in response to schedules associated with each of the items determined in the automatically accessing step.

According to one feature, the schedules are safety inspection schedules specific to each of the items determined in the automatically accessing step.

As one feature, the schedules are training schedules specific to each of the items determined in the automatically accessing step.

In one feature, the method further includes assigning at least one of a user and a location to at least some of the items determined in the automatically accessing step and storing the items in a database.

As one feature, the step of electronically transmitting includes transmitting at least one of a date of purchase, a date of service entry, to whom issued, and as manufactured data specific to each of the items determined in the automatically accessing step.

According to one feature, the plurality of personal protection equipment items include at least two products selected from a group consisting of safety harnesses, lanyards, lifelines, fall arrestors, safety belts, gas detectors, self contained breathing apparatuses, facepieces, protective gloves, and protective garments.

In one feature, the step of wirelessly receiving further includes wirelessly receiving identifiers with a size of 96 bits, and the method further includes eliminating the identifiers with a size of 96 bits from consideration in the system.

In accordance with one aspect of the application, a system is provided for managing the safety of a plurality of personal protection equipment items. The system includes a plurality of personal protection equipment items, each item having an ultra high frequency RFID chip attached thereto with a unique identifier encoded therein that is assigned to the item and no other item of the plurality, the unique identifier having a size of at least 128 bits; an electronic database associating each item and information specific to the item with the 128 bit unique identifier assigned to the item; an electronic database associating specific safety information with each item; a wireless reader capable to receive the unique identifier from each of the RFID chips; a programmed processor operably associated with the wireless reader and configured to access the databases and identify each item and the specific safety information for the item in response to the wireless reader receiving the unique identifier from the RFID chip attached to the item; and a display operably associated with the processor to receive the specific safety information and display it to a user.

As one feature, the unique identifier has a size of 128 bits.

In one feature, the wireless reader is a handheld device and the system further includes an electronic database operably associated with the programmed processor to receive information specific to each item of the plurality of personal protection equipment in response to the handheld device receiving the unique identifier encoded in the chip attached to each the item.

According to one feature, the plurality of personal protection equipment items include at least two products selected from a group consisting of safety harnesses, lanyards, lifelines, fall arrestors, safety belts, gas detectors, self contained breathing apparatuses, facepieces, protective gloves, and protective garments.

Other features and advantages of the disclosed method and system will become apparent from a review of the entire specification, including the appended claims and drawings.

DETAILED DESCRIPTION

Figure 1:
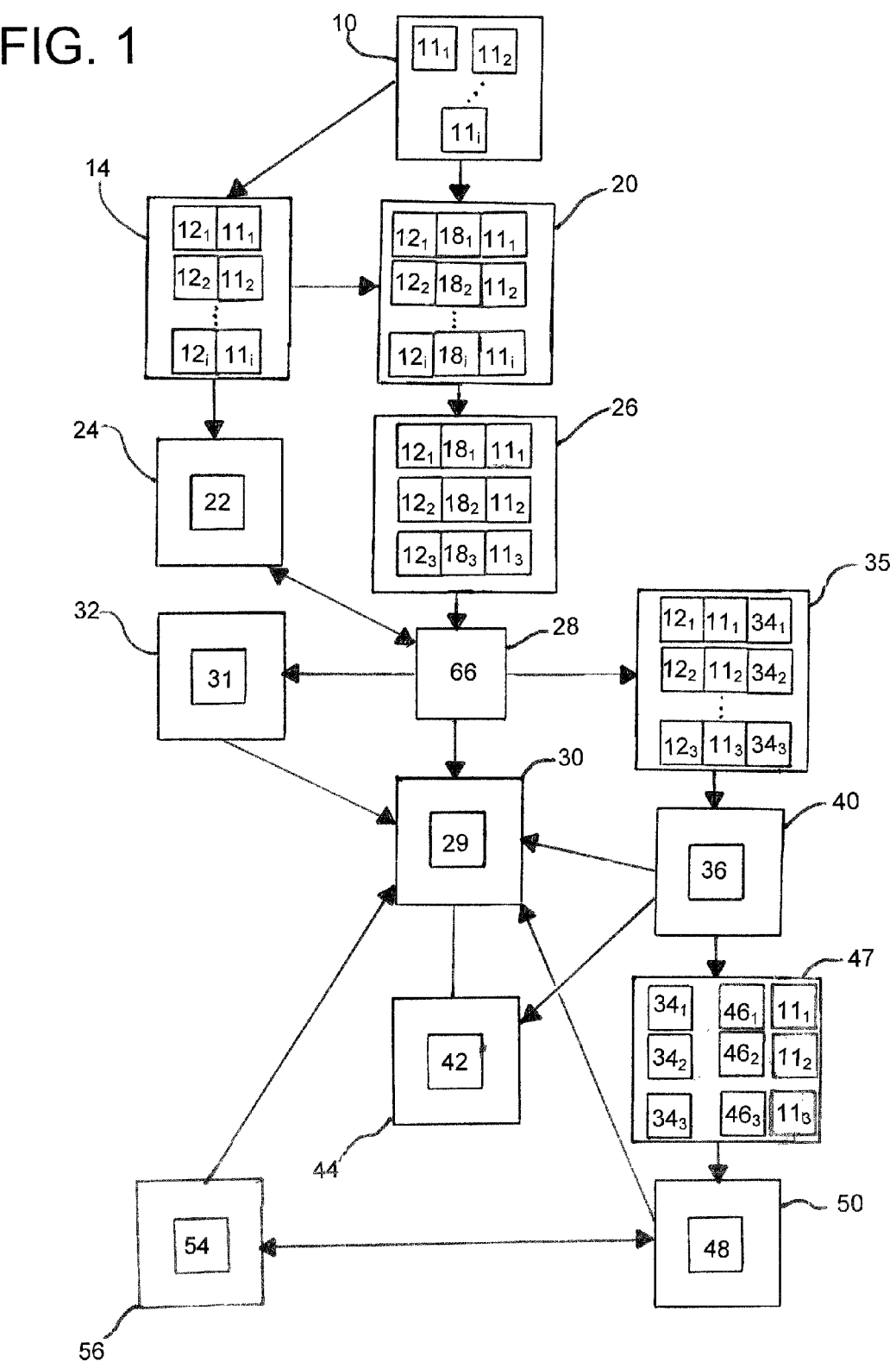
FIG. 1 is a diagrammatic representation of a method and system for managing the safety of a plurality of personal protection equipment items.
Figure 2:
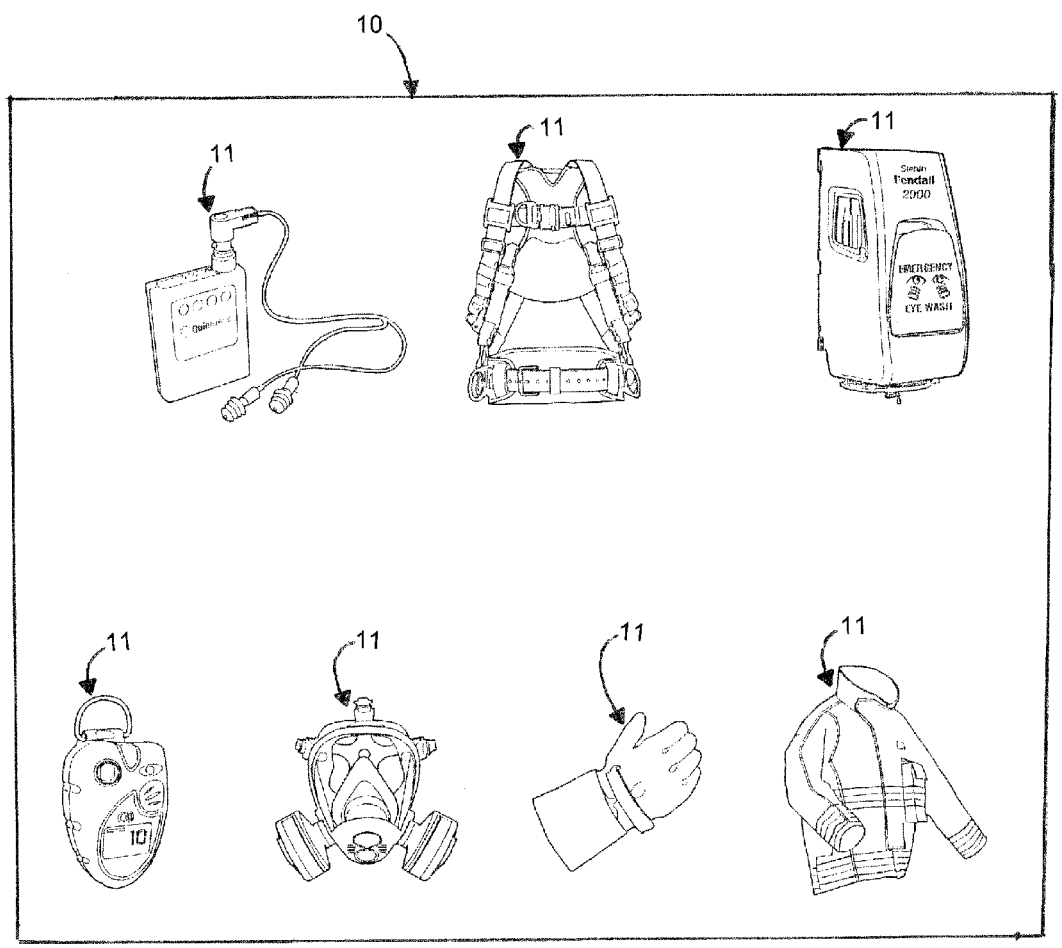
FIG. 2 is a diagrammatic representation of a plurality of personal protection equipment items.

With reference to FIG. 1, a method and system are shown for managing the safety of a plurality 10 of personal protection equipment (PPE) items 11. The PPE items 11 can include any products that are utilized to protect a worker and/or provide a safe work environment, some examples of which are illustrated in FIG. 2. While not intended as an exhaustive list, examples of such PPE items 11 include products such as safety harnesses, lanyards, lifelines, fall arrestors, safety belts, other fall protection devices and equipment, gas detectors, self-contained breathing apparatuses, respirators, air/oxygen storage cylinders/tanks, facepieces, protective garments, protective gloves, eyewash stations, etc. Such PPE items 11 are well known in the industry and further description of the specific details of such items 11 is not required for an understanding of the system and not described herein.

The disclosed method and system allows end users of the PPE items 11 to have ready access to safety information about the PPE items 11 that are used by the workers employed by the end users and about the workers themselves. For each PPE item 11 utilized by an end user, this information can include the date of manufacture, sizing information, material information, the date of purchase, the date of entry into service, inspection and maintenance schedules and rules, to whom and when each PPE item 11 was assigned or issued, who assigned or issued each PPE item 11, the training history and certification for each worker, and advisory information such as recalls or mandatory upgrades for each PPE item 11. The method and system allow end users to request reports of such information, including, for example, reports of the PPE items 11 in their inventory, reports of which PPE items 11 are assigned to which of their workers, reports of the training certifications for each of their workers, reports of who assigned what particular PPE item 11 and when it was assigned and to whom it was assigned, and reports of which workers and their associated PPE items 11 are assigned to each particular worksite that the end user occupies.

As shown in FIG. 1, the method includes the steps of:

(a) assigning a unique identifier 12 with a size of at least 128 bits to each PPE item 11 of the plurality of PPE items 10, as shown at block 14;

(b) for each PPE item 11, encoding the unique identifier 12 assigned to the PPE item 11 in block 14 into an Ultra High Frequency RFID chip 18 and attaching the chip 18 to the item either before or after the encoding, as shown at block 20;

(c) storing the unique identifiers 12 in a database 22 that associates each identifier 12 with the PPE item 11 corresponding to the identifier 12, as shown at block 24;

(d) wirelessly receiving the unique identifier 12 from each of a plurality of the RFID chips 18 after the chips 18 are attached to their corresponding PPE item 11, as shown at block 26;

(e) automatically accessing the database 22 to determine which PPE items 11 correspond to each of the unique identifiers 12 received in the wirelessly receiving step of block 26, as shown at block 28; and (f) electronically transmitting to a user 29 information specific to the PPE items 11 determined in the automatically accessing step of block 28, as shown at block 30.

Those skilled in the art will appreciate that there are a number of possible methods for determining a 128 bit unique identifier 12 to be assigned to a PPE item 11 in block 14. Accordingly, the details of such methods are not critical to the application. However, one possible method involves utilizing know and publicly available algorithms that generate such unique identifiers, such as for example, algorithms that generate a Universally Unique Identifiers, also known as Globally Unique Identifiers, which require no centralized authority to administer them.

Typically, the user 29 will be an end user of the PPE items 11, such as, for example, a company whose worksites require that its workers utilize various PPE items 11, and the wirelessly receiving step shown at block 26 will be initiated by the end user 29 and will be performed locally at the end user's location, which often could be a worksite. In this regard, the end user 29 will employ some sort of suitable RFID reader, many of which are know, including stationary RFID readers and RFID readers located in portable/handheld devices. Furthermore, the electronically transmitting step shown at block 30 will often include displaying the information to a user 29 on an electronic display, such as an LCD screen of a stationary or portable/handheld device. The method and system contemplate a plurality of end users 29 and that such end users 29 can be dispersed geographically.

The method can further include storing safety information and other item specific information associated with each PPE item 11 of the plurality of items 10 in a database or databases 31, as shown at block 32. This information can include, for example, build information, material information, the date the particular PPE item 11 was manufactured, sizing/fit information specific to the PPE item 11, the date when the particular PPE item 11 was put into service, inspection instructions and schedules specific to the PPE item 11, maintenance instructions and schedules specific to the PPE item 11, information regarding recalls specific to the PPE item 11, repair information specific to the PPE item 11, any required training for the PPE item 11, etc. Some, or all, of this information can be all, or part, of the information transmitted to a user 29 in block 30, and can either be transmitted in response to a request by the user 29 for all, or part, of the information, or can be automatically transmitted to the user 29, such as by an email to the user 29, in response to a schedule, such as an inspection or maintenance schedule, to alert the user 29 of upcoming dates in the schedule, such as an upcoming inspection requirement or maintenance requirement. Some of the information, such as the build information, the date of manufacture, inspection and maintenance instructions and schedules, and recall information will typically be entered by the manufacturer or provider of the PPE items 13, while other of the information, such as the date introduced into service and repair information, will often be entered by the end users 29.

To the extent that at least some of the items 13 are intended to be utilized by a single person or worker, it is desirable to associate each of the PPE items 11 so intended with each specific person or worker that will be utilizing the PPE item 11. In view of this, the method can also include assigning a specific person or worker 34 to each of the PPE items 11 that will be utilized by that specific person 34, as shown at block 35, and storing the name (or other identifier) of each assigned person 34 in a database 36 in association with the unique identifier 12 of the PPE item 11 to which the person 34 is assigned, as shown at block 40. The database 36 can be accessed by the system to provide the name, or other identifier, of each of the persons 34 together with their assigned PPE items 11 as all, or part of, the information transmitted to a user 29 in block 30. Typically, the information for each person 34 will be entered into the database 36 by a user 29 and the system can access the database 36 as needed to correlate information for each of the persons 34 and their assigned PPE items 11. It should be understood that the system and method contemplate that multiple PPE items 11 can be assigned to a single person 34.

To the extent that some of the PPE items 11 require training for their proper use, it may be desirable to have ready access to the training records for each assigned person 34, particularly the training records that are relevant to the PPE items 11 assigned to the person 34. Thus, according to the method, the training records for each person 34 can be stored in a database 42 in association with the person's name or identifier, as shown at block 44. The database 42 can be accessed to provide the training records as all, or part of, the information transmitted to a user 29 in block 30. Typically, the training records will be entered into the database 42 by a user 29 and the system can access the database 42 to determine if each person 34 has the appropriate training required by each PPE item 11 assigned to the person 34 and transmit the need for any additional training to a user 29 as all, or part of, the information transmitted to the user 29 in block 30.

It may also be desirable to have ready access to the specific location/worksite 46 where each of the PPE items 11 is being utilized, particularly for companies that have a plurality of worksites 46, with each worksite 46 requiring different ones of the PPE items 11. Accordingly, the method can also include assigning a worksite 46 to some or all of the PPE items 11 and/or each person 34 assigned to a PPE item 11, as shown at block 47. Further in this regard, the assigned worksites 46 are stored in a database 48 in association with the person 34 and/or PPE items 11 corresponding thereto, as shown at block 50. Typically, this worksite information will be entered into the database 48 by a user 29. The database 48 can be accessed by the system to provide the worksites 46 and their corresponding information as all, or part of, the information transmitted to a user 29 in block 30.

Figure 3:
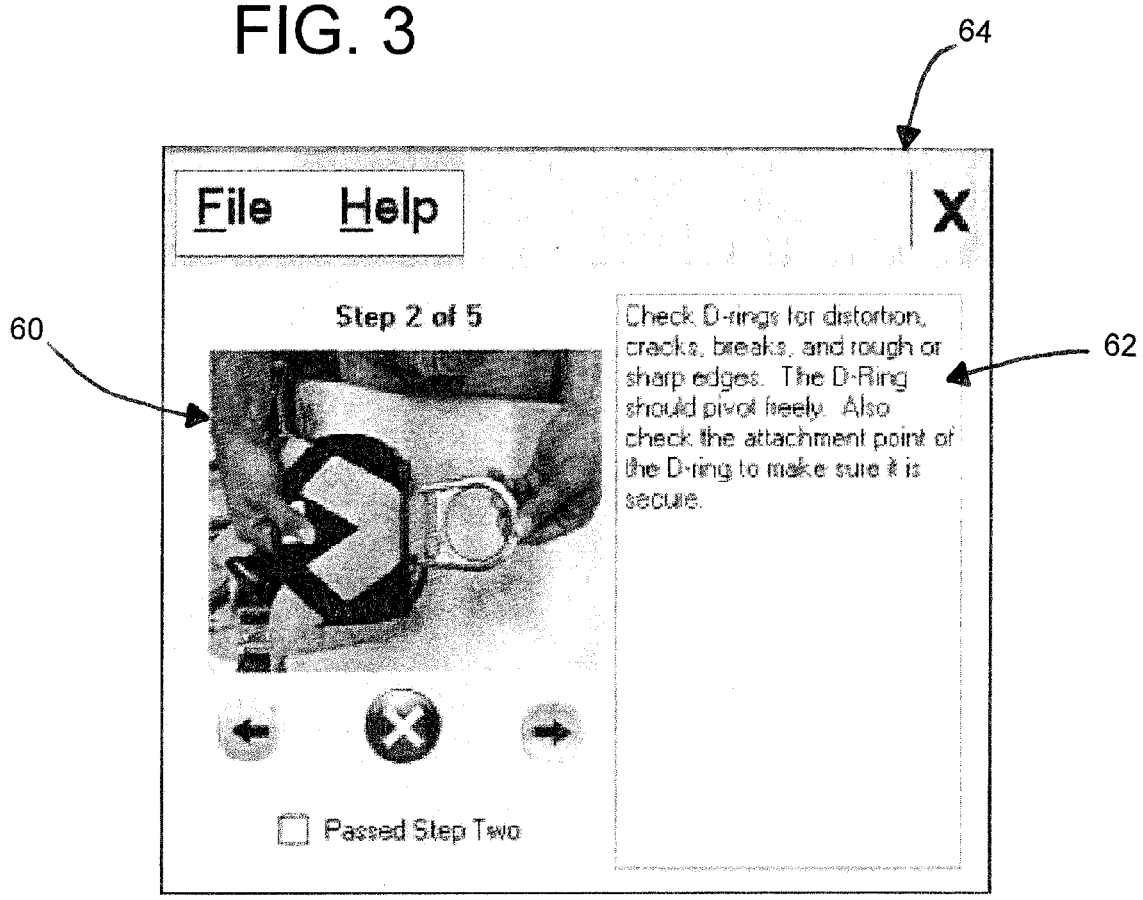
FIG. 3 is an illustration of an electronic, touch screen display for transmitting information to a user of the method and system.

Any inspection and maintenance information stored in the database or databases 31 in block 32 can include specific instructions for inspecting and maintain each PPE item 11 in connection with the inspection and maintenance intervals for each PPE item 11. In this regard, the instructions can include images or pictorial representations 60 that illustrate how to perform each inspection or maintenance step in addition to text 62 that explains how to perform the inspection or maintenance step, as shown, for example, in the touch screen, electronic display 64 illustrated in FIG. 3. Thus, the method can include storing such inspection and/or maintenance instructions, including words and images/pictures, in the database or databases 31 and transmitting a real-time stream of such inspection and/or maintenance instructions to a user 29, such as a safety manager, in block 30 to ensure that the user 29 is properly inspecting and/or maintaining the PPE item 11. In this regard, the method and system can also include a requirement that the user 29 indicate that each step of the inspection and/or maintenance instruction was passed and/or completed for an entire inspection and/or maintenance protocol to be indicated as "passed" in the database or databases 31, and the inspection or maintenance protocol will be stored as "failed" absent an indication that all the steps for the protocol have been passed or completed. Furthermore, the identification of the particular user 29 performing the inspection or maintenance steps can be entered into the database or databases 31 for each step of the inspection and/or maintenance protocol.

It may also be desirable to provide notification of product recalls that may be issued for any of the PPE items 11. Accordingly, the method can also include transmitting such recall information for any PPE item 11 to the user 29 in block 30 and can also include storing such recall information in the database or databases 31 in block 14.

To assist in "safety readiness", the method can also include storing in a database 54 a list of the particular PPE items 13 required for each worksite 46 and/or job at a worksite 46, as shown at block 56, and transmitting these requirements to a user 29 to ensure that each person 34 at a particular worksite 46 has the appropriate PPE items 13 for the worksite 46 and/or job.

While many possible system configurations are possible, it is envisioned that the disclosed method will be carried out by utilizing one or more programmed processors in the form of networked computing devices and associated databases, including local computing devices and databases that are specific to particular users 29 and centralized computing devices and databases that are accessible to each of the users 29 via network connections which can either be wireless connections, wired connections, or a combination of wireless and wired connections. These network connections can take many forms, and can include, for example, local area networks (LAN's), virtual private networks (VPN's), and web portals or apps that access the Internet, and/or combinations of all the foregoing. The computing devices can include handheld computing devices, laptops, desktops, and servers, all employing known user interfaces, such as LCD displays, touch screen displays, and keyboards for data entry and transmission.

Figure 4:
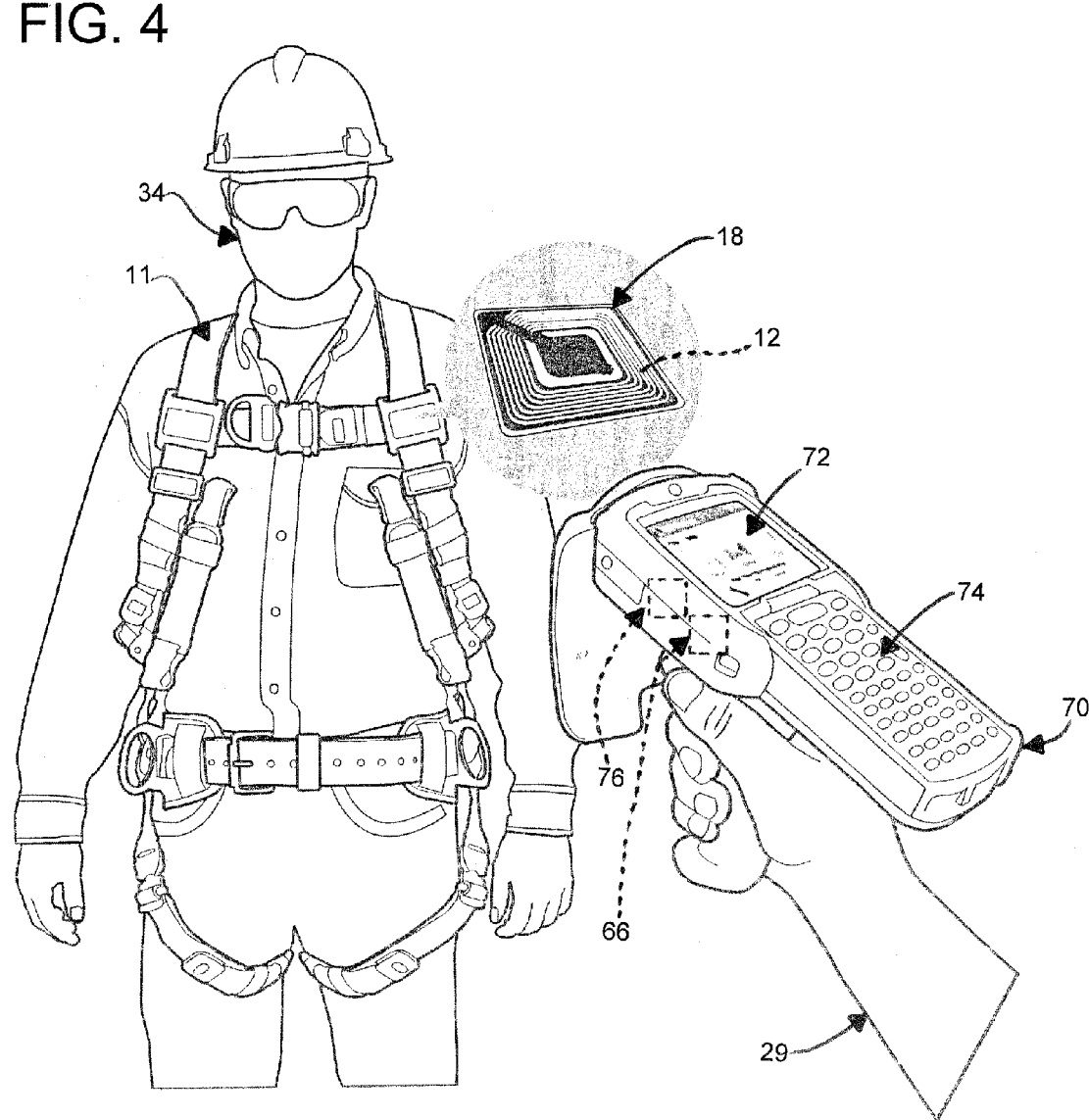
FIG. 4 is an illustration of selected components of the method and system as they are employed according to the method and system.

FIG. 4 illustrates one example of some components utilized according to the method and system. Specifically, FIG. 4 shows a PPE item 11 in the form of a safety harness being worn by an assigned person 34, the safety harness 11 having an Ultra High Frequency RFID chip 18 affixed thereto with a 128 bit unique identifier 12 encoded therein. A user 29 employs a handheld computing device 70 having a touch screen display 72, a keyboard entry pad 74, a trigger switch (underlying one of the finger's of the user 29), a programmed processor, shown diagrammatically at 66, and an RFID chip reader, shown diagrammatically at 76. The user 29 scans the Ultra High Frequency RFID chip 18 by engaging the trigger of the handheld device 70 which then performs the steps shown in blocks 26, 28 and 30. In this regard the handheld device 70 may access the programmed processors 66 in a network of computing devices and databases, including a centralized computing device or devices and database or databases using either a wireless or wired connection in conjunction with a web portal to the internet. The touch screen display 72 and/or the entry pad 74 of the handheld device 70 can then be employed by the user 29 to enter information for use in the system and method, such as the information discussed above in connection with blocks 35, 40, 44, 47 and 50.

It should be understood that the databases discussed herein may be maintained locally, or centrally, or both.

It can be appreciated by those skilled in the art that there are a number of commercially available software applications and utilities that can be utilized to implement the various steps of the invention in the one or more processors 66. For example, the handheld device 70 can utilize a Windows form application using .net technology and Windows SQL CE that can sync with a master SQL server via a wireless TCP/IP connection. It can also be appreciated that various levels of built-in security can be utilized in connection with the software and databases, including software that will time out/log out a user and return to a log in screen if there is no user input received in a given amount of time. It may also be desirable to assign each user 29 a security level, such as for example, default security levels that would include a Read Only security level, a Read-Write security level, a Read-Write-Inspect security level, and a Read-Write-Inspect-Configure security level. The Read Only users 29 will not be able to make any changes or inspect any equipment. The Read-Write users 29 will be able to make changes to data, but will not be able to affect other users 29, inspect equipment or change the application configuration. Read-Write-Inspect users 29 will have all of the previous rights plus the ability to inspect equipment. The Read-Write-Inspect-Configure users 29 will have full access to make changes to data, users, inventory, inspections and configurations.

It will be appreciated by those skilled in the art that by utilizing an Ultra High Frequency RFID ships 18, the disclosed method and system can read the unique identifiers 12 for each of the PPE items 13 without requiring that the reader be held is close proximity to the PPE items 13, and that multiple RFID chips 18 can be read at one single time. It will further be appreciated that by utilizing a unique identifier 12 that is at least 128 bit in size for each PPE item 11, the method and system can readily sort a plurality of unique identifiers that are read at any single time to determine which of the unique identifiers are assigned to PPE items 13 in the system. In this regard, it should be appreciated that the method system can automatically discard unique identifiers that have a size smaller than 128 bits, such as 96 bit identifiers, so as to eliminate from consideration unique identifiers utilized in other products and that may be read when the user's PPE items 13 are scanned for their unique identifiers.

It will further be appreciated by those skilled in the art that there are many possible modifications to be made to the specific features and components of the disclosed embodiments while keeping within the spirit of the concepts disclosed herein. Accordingly, no limitations to the specific forms of the embodiments disclosed herein should be read into the claims unless expressly recited in the claims.

The invention claimed is:

1. A method of managing the safety of a plurality of personal protection equipment items, the method comprising the steps of:
   assigning a unique identifier with a size of at least 128 bits to each item of a plurality of personal protection equipment items;
   for each item of the plurality of personal protection equipment items, encoding the unique identifier assigned to the item into an ultra high frequency RFD chip and attaching the chip to the item either before or after said encoding;
   storing the assigned unique identifiers in a database that associates each identifier with the item corresponding to the unique identifier;
   wirelessly receiving the unique identifier from each of a plurality of the chips after the chips are attached to their corresponding item;
   automatically accessing the database to determine which items correspond to each of the unique identifiers received in the wirelessly receiving step;
   electronically transmitting to a user information specific to the items determined in the automatically accessing step;
   wherein the step of electronically transmitting information comprises automatically transmitting the information to the user in response to schedules associated with each of the items determined in the automatically accessing step; and
   wherein the schedules are safety inspection schedules specific to each of the items determined in the automatically accessing step.

2. The method of claim 1 wherein the assigning step comprises assigning a 128 bit unique identifier to each item of the plurality of personal protection equipment items.

3. The method of claim 1 wherein the step of electronically transmitting information comprises transmitting training information corresponding to the items determined in the automatically accessing step.

4. The method of claim 3 further comprising assigning a specific person to at least some of the items determined in the automatically accessing step and wherein the training information comprises training records for each specific person assigned to one of the items.

5. The method of claim 1 wherein the schedules further comprise training schedules specific to each of the items determined in the automatically accessing step.

6. The method of claim 1 further comprising assigning at least one of a user and a location to at least some of the items determined in the automatically accessing step and storing the items in a database.

7. The method of claim 1 wherein the step of electronically transmitting comprises transmitting at least one of a date of purchase, a date of service entry, to whom issued, and as, manufactured data specific to each of the items determined in the automatically accessing step.

8. The method of claim 1 wherein the plurality of personal protection equipment items include at least two products selected from a group consisting of safety harnesses, lanyards, lifelines, fall arrestors, safety belts, gas detectors, self contained breathing apparatuses, facepieces, protective gloves, and protective garments.

* * * * *